United States Patent (10) Patent No.: US 10,941,891 B2
Tiberghien et al. (45) Date of Patent: Mar. 9, 2021

(54) COUPLING ELEMENT FOR CONNECTING A FLUID LINE

(71) Applicant: STAUBLI FAVERGES, Faverges-Seythenex (FR)

(72) Inventors: Alain-Christophe Tiberghien, Sevrier (FR); Christophe Durieux, Gilly sur Isere (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 282 days.

(21) Appl. No.: 16/041,973

(22) Filed: Jul. 23, 2018

(65) Prior Publication Data
US 2019/0032832 A1 Jan. 31, 2019

(30) Foreign Application Priority Data
Jul. 25, 2017 (FR) ...................... 1757043

(51) Int. Cl.
*F16L 37/252* (2006.01)
*F16L 37/107* (2006.01)
*F16L 37/23* (2006.01)

(52) U.S. Cl.
CPC ........... *F16L 37/252* (2013.01); *F16L 37/107* (2013.01); *F16L 37/23* (2013.01)

(58) Field of Classification Search
CPC ....... F16L 37/252; F16L 37/107; F16L 37/22; F16L 37/23
USPC .................................. 285/85, 360
See application file for complete search history.

(56) References Cited

U.S. PATENT DOCUMENTS

| 1,857,420 | A | * | 5/1932 | Wolford | F16L 37/252 |
| | | | | | 285/85 |
| 4,060,219 | A | * | 11/1977 | Crawford | F16L 37/23 |
| 4,150,691 | A | * | 4/1979 | Maldavs | F16L 37/23 |
| 4,643,459 | A | | 2/1987 | Carson | |
| 5,184,851 | A | | 2/1993 | Sparling et al. | |
| 2015/0001844 | A1 | * | 1/2015 | Tiberghien | F16L 37/252 |
| 2016/0281895 | A1 | * | 9/2016 | Allevi | F16L 37/23 |
| 2017/0191595 | A1 | * | 7/2017 | Van Scyoc | F16L 37/23 |

FOREIGN PATENT DOCUMENTS

| DE | 202009017642 U1 | 4/2010 |
| EP | 1862719 A1 | 12/2007 |
| FR | 2421327 A1 | 10/1979 |

OTHER PUBLICATIONS

Search Report for related priority application No. FR 1757043, dated Mar. 12, 2018.

* cited by examiner

*Primary Examiner* — Zachary T Dragicevich

(57) ABSTRACT

A coupling element for connecting a fluid line includes a locking pin movable in translation between a first position in which it emerges from a support surface and a second position in which it is retracted relative to the support surface. The coupling element further includes a return member for returning the pin to its first position, and an unlocking ring rotatable about a longitudinal axis and surrounding the tubular body of the coupling element. The unlocking ring is mechanically coupled to the pin by means of a ball and a helical groove for guiding the ball in order to transform the rotation of the unlocking ring into a translational movement of the pin from its first position towards its second position.

13 Claims, 12 Drawing Sheets

COUPLING ELEMENT FOR CONNECTING A FLUID LINE

CROSS-REFERENCE TO RELATED APPLICATIONS

This application claims priority to French application no. 1,757,043 filed on Jul. 25, 2017.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

The present invention relates to a coupling element for connecting a fluid line. The invention also relates to a coupling comprising such a coupling element, connected to another coupling element or to a reservoir.

In particular, the invention relates to a coupling element for rapid connection of a fluid line to a toothed orifice which is part of a reservoir or other coupling element.

U.S. Pat. No. 5,184,851-A discloses a known coupling element connected to a pipe and having, at its free end, engagement elements extending longitudinally from a support surface. When connecting with another similar coupling element, the engagement elements are inserted between the teeth of the other coupling element until the support surface contacts the other coupling element. Rotation is required to enable the engagement elements to engage the teeth.

To avoid an accidental disconnection, for example under the effect of a torsion torque exerted by the pipe, the coupling element comprises a locking pin that is movable between a first position, in which it emerges from the support surface to block any displacement of the teeth in rotation relative to the engagement elements, and a retracted position, in which the displacement of the teeth is permitted, allowing rotation of the one coupling element relative to the other coupling element. The locking pin is mechanically coupled to a circular ring surrounding the coupling element. This ring is rotatable about a longitudinal axis of the coupling element. To move the locking pin to its second position, it is necessary to rotate the ring in a given direction of rotation. The locking pin is then automatically returned to its first position by a spring acting between the body of the coupling element and the locking pin. An additional spring acts between the body of the coupling element and the ring in order to rotate it in the opposite direction of rotation.

This known coupling element has the disadvantage that the restoring force exerted on the ring is, in practice, insufficient to bring it back to a position in which the locking pin is in its first position. Locking is not ensured correctly, so that there is a risk of accidental disconnection. Because of the design of the coupling element, the space available to receive the return spring is limited, which makes it difficult to use a spring capable of exerting a greater force. In addition, the industrial production of such a coupling element is complicated because of the number of parts required, some of which are very small.

It is these drawbacks that the invention more particularly aims to remedy by proposing a coupling element for connecting a fluid line rapidly, wherein the risk of accidental disconnection is reduced and industrial production is simplified.

BRIEF SUMMARY OF THE INVENTION

To this end, the invention relates to a coupling element for connecting a fluid line to a complementary element, in particular to an orifice of a reservoir, wherein this coupling element comprises a tubular body extending along a longitudinal axis, wherein the tubular body is provided at one end with a connection interface to a fluid line and also an engagement element at the opposite end, wherein the engagement element extends longitudinally with respect to a support surface perpendicular to the longitudinal axis and comprising a radial portion of a flange oriented outwards from the longitudinal axis and extending over an angular sector of engagement. The coupling element also comprises:
- at least one locking pin movable in translation inside the tubular body, parallel to the longitudinal axis, between a first position in which it emerges from the support surface and a second position in which it is retracted inside the tubular body relative to the support surface,
- a return member to restore the locking pin to its first position,
- an unlocking ring, surrounding the tubular body and outside thereof, wherein the unlocking ring is rotatable about the longitudinal axis.

The unlocking ring is mechanically coupled to the locking pin by means of a ball and a helical groove to guide the ball, so as to transform the rotational movement of the unlocking ring about the longitudinal axis into a translational movement of the locking pin from its first position to its second position.

Thanks to the invention, the use of a ball and a helical groove to mechanically couple the unlocking ring with the locking pin overcomes the aforementioned drawbacks. Such coupling makes it possible to ensure better reversibility of the movement of the locking pin. This also improves the energy efficiency of the system by reducing friction, because the ball rolls in the groove. In fact, the restoring force actually received by the unlocking ring is greater when compared to known cases. This reduces the risk of the locking pin not returning to its first position. The reliability of the locking is thus improved.

According to advantageous but non-mandatory aspects of the invention, such a coupling element may incorporate one or more of the following characteristics, taken separately or in any technically feasible combination:
- the helical groove passes through a portion of the tubular body, while the unlocking ring has a longitudinal guide housing, wherein the ball is received within the helical groove and the guide housing to be guided.
- the helical groove is formed on an inner surface of the unlocking ring, while a longitudinal groove passes through a portion of the longitudinal body, wherein the ball is received within the helical groove and the guide housing to be guided.

the helical groove is formed on an inner surface of the unlocking ring, while a longitudinal groove is integral with the locking pin, wherein the ball is received within the helical groove and the longitudinal groove to be guided.

the ball interacts with a groove integral with the locking pin, wherein this groove is delimited along the longitudinal axis by a proximal edge, wherein the ball is also received inside this groove and presses on this proximal edge to drive the locking pin to its second position.

the locking pin is integral with a drive ring movable in translation along the longitudinal axis, wherein the groove is formed on the drive ring and the return member acts on the drive ring.

the groove is formed directly on the locking pin and forms the longitudinal groove integral with the locking pin, while the return member acts directly on the locking pin.

the groove is also delimited by a distal edge, so that the distal edge is in contact with the ball and presses on the ball when the locking pin is moved to its second position under the effect of a force external to the coupling element.

the coupling element comprises a valve movable in translation inside the tubular body, between a closed fluid passage position and an open fluid passage position, wherein the valve comprises a rigid sensor which emerges from the support surface when the valve is in the closed position.

the helical guide groove of the ball follows a circular helix portion whose tangential angle at each point relative to the longitudinal axis is between 30 and 60°.

the tangential angle at each point is constant with respect to the longitudinal axis.

According to another aspect, the invention relates to a coupling comprising a first coupling element and a second coupling element, wherein at least one of the first and second coupling elements is as previously described.

BRIEF DESCRIPTION OF THE SEVERAL VIEWS OF THE DRAWING

The invention will be better understood and other advantages thereof will become more apparent upon reading the description which follows, of an embodiment of a coupling element given solely by way of example and made in reference to the accompanying drawing, wherein.

DETAILED DESCRIPTION OF THE INVENTION

FIGS. 1 to 9 show a coupling element 2 for coupling a supply line of a fluid, such as a liquid, to a complementary coupling element to allow circulation of this fluid between the two elements.

In this example, the complementary coupling element is a circular orifice 4 of a reservoir. The connection between the coupling element 2 and the orifice 4 is intended to ensure the filling of this reservoir in a sealed manner.

The invention is particularly applicable to the rapid connection of a coolant pipe to a tank fitted to a motor vehicle for filling. The coupling element 2 is then temporarily connected to the orifice 4 of the reservoir, wherein the latter is designed to receive a plug rapidly by screwing.

Of course, other applications are possible, for example in the medical or food field. The complementary element may be other than a tank orifice 4. Thus, all that is described in the following with reference to the orifice 4 also applies to such a complementary element.

Figure 2:
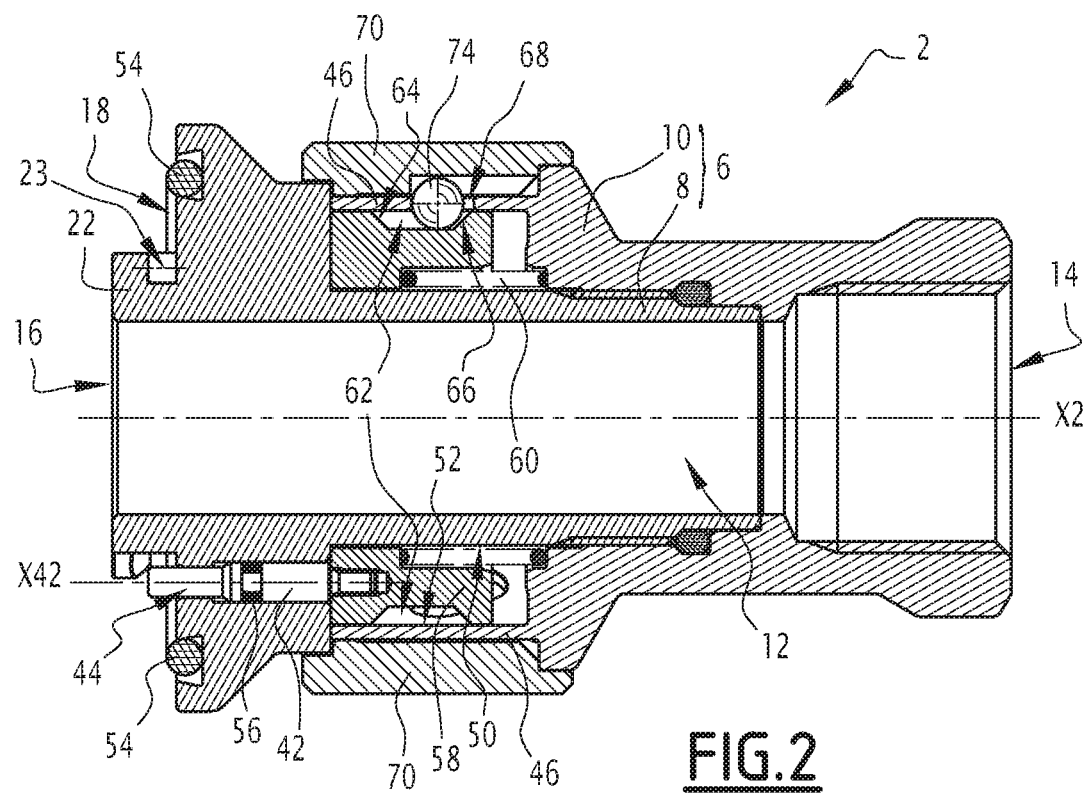
FIG. 2 shows a schematic representation, in a longitudinal sectional view, of a coupling element according to a first embodiment of the invention, wherein locking means are illustrated in a first position.
Figure 3:
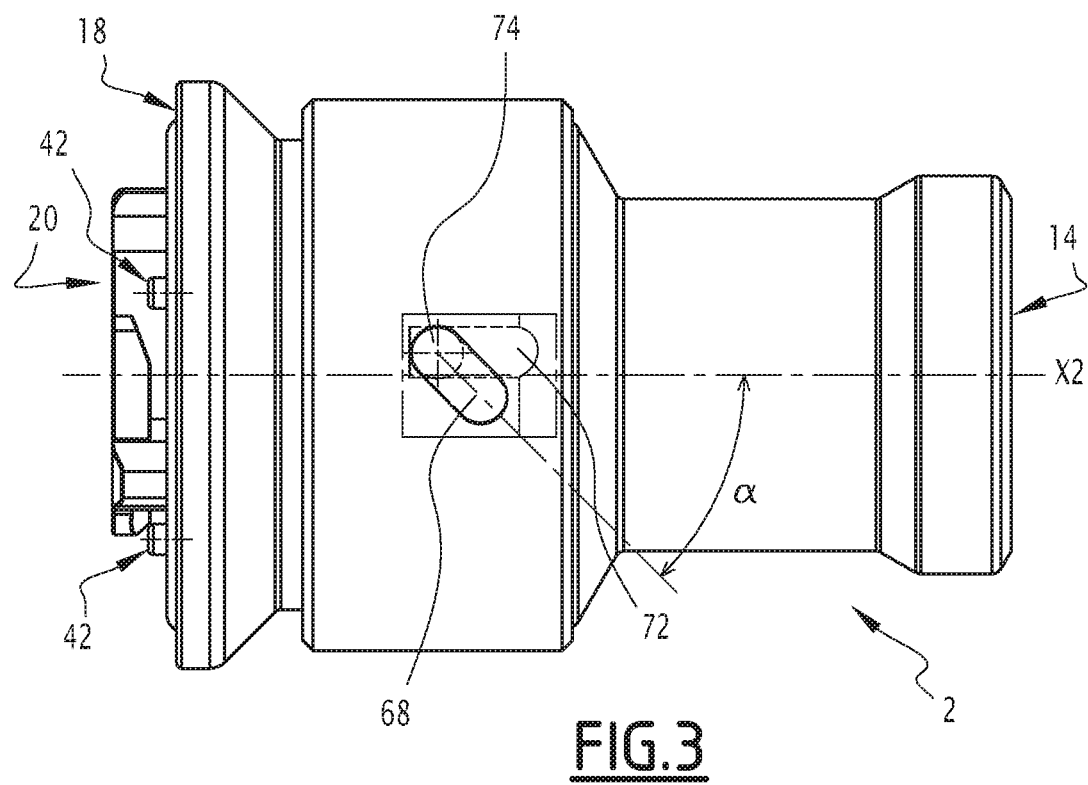
FIG. 3 shows a schematic representation, in a partially cutaway profile view, of the coupling element of FIG. 2.

As illustrated more particularly in FIG. 2, the coupling element 2 comprises a tubular body 6 comprising a nozzle 8 and an adapter 10, in this case screwed into one another. The tubular body 6 extends substantially along a longitudinal axis X2 of the coupling element. In this example, the nozzle 8 and the adapter 10 are arranged coaxially around the longitudinal axis X2.

This tubular body 6 defines a hollow cylindrical passage 12 allowing the circulation of a fluid, in this case a liquid.

The tubular body 6 comprises an inlet opening 14 which forms a connection interface with a fluid line. For example, the inlet opening 14 may be a tapped hole that provides a sealed connection with a threaded pipe. In this example, the inlet opening 14 is formed on a rear part of the body 6, in this case on the adapter 10.

The tubular body 6 has, at its end opposite the inlet opening 14, an outlet opening 16 which is in this case designed to open towards the inside of the reservoir when the coupling element 2 is connected to this reservoir. The outlet opening 16 is arranged on a front part of the tubular body 6.

Of course, the fluid can flow inside the passage 12 in one direction or the other between the inlet opening 14 and the outlet opening 16.

The tubular body 6 further comprises a support surface 18, essentially planar here, which is formed at its front end, here on the nozzle 8, and which extends perpendicularly to the longitudinal axis X2.

The coupling element 2 has a front tubular portion 20 which protrudes from the support surface 18 along the longitudinal axis X2.

The tubular portion 20 comprises, at its end, at least one portion of a flange 22 which occupies an angular sector S22 defined between two planes that are coaxial with the longitudinal axis X2 and which defines an angular sector of engagement. This angular sector of engagement S22 is defined with respect to a central point passing through the longitudinal axis X2.

Each portion of the flange 22 is associated with a stop 24 which is part of the tubular portion 20. The volume of engagement between a portion of a flange 22 and the support surface 18 is denoted 23, wherein this volume of engagement 23 has a length E22 measured parallel to the longitudinal axis X2 and is referred to as spacing E22.

In this example, the portions of the flange 22 are three in number and are identical to each other and spaced apart from each other with regular angular spacing.

Figure 1:
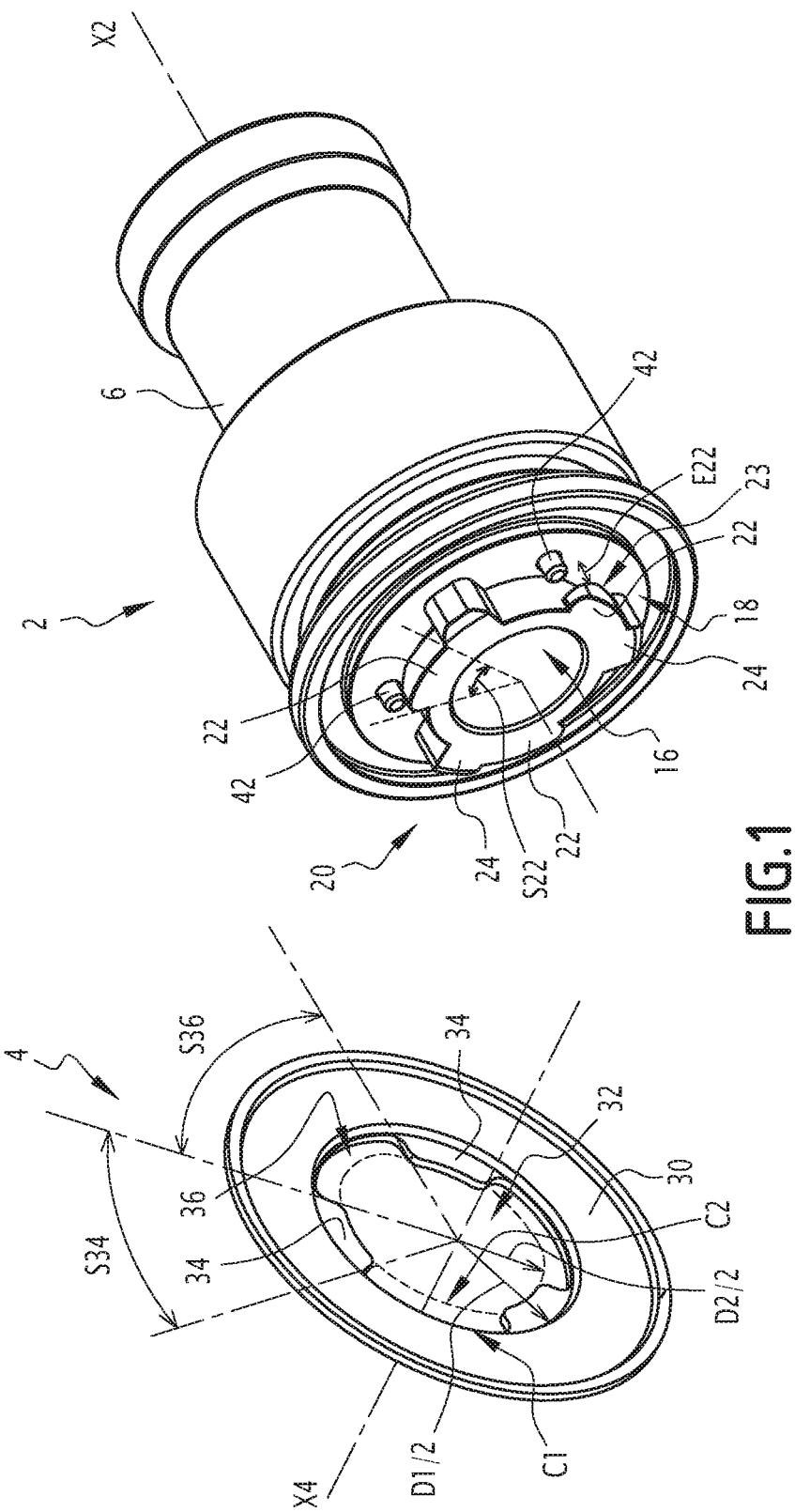
FIG. 1 shows a schematic representation, in an isometric perspective view, of a coupling element according to the invention and intended to be connected to a circular orifice of a reservoir.

As illustrated in FIG. 1, the orifice 4 comprises a flat plate 30 provided with a central opening 32 on the edge of which is formed at least one tooth 34.

The teeth 34 extend from an edge of the central opening 32 towards the center of the orifice 4, between a first circular contour C1 of the central opening 32 of the orifice 4 having a large diameter D1, and a second circular contour C2 of the central opening 32 of the orifice 4 having a small diameter D2 that is smaller than the large diameter D1. In FIG. 1, only the radii corresponding to the circular contours C1 and C2 are illustrated, respectively, by the references D1/2 and D2/2.

X4 denotes an axis of the orifice 4 extending perpendicular to this orifice and passing through the center of the central opening 32. The small diameter D2 and the large diameter D1 are defined relative to the center of the central opening 32. The circular contours C1 and C2 are concentric. The axis X4 is perpendicular to the geometric plane of the plate 30. The teeth 34 are separated in pairs by inter-tooth spaces 36.

Preferably, the number of teeth 34 and their shape are complementary to the number and shape of the portions of the flange 22 of the tubular portion 20 of the coupling element 2. In this example, the reservoir 4 is provided with three identical regularly-spaced teeth 34.

The teeth 34 of the orifice 4 and the angular engagement sectors S22 formed by the portions of the flange 22 are complementary and are intended to secure the coupling element 2 to the orifice 4 prior to the circulation of a fluid. The angular engagement sectors S22 formed by the portions of the flange 22 are designed to be contained in the angular spaces 36 which separate the teeth 34 from the orifice. S34 denotes the angular sectors associated with the teeth 34, while S36 denotes the angular sectors associated with the inter-tooth spaces 36.

The coupling element and the orifice 4 are thus designed to be moved reversibly between a connected configuration, also called a connected configuration, and a disconnected configuration of the other, also referred to as an uncoupled configuration.

The coupling element 2 further comprises locking means to hold the coupling element 2 locked in the configuration coupled with the orifice 4.

Figure 4:
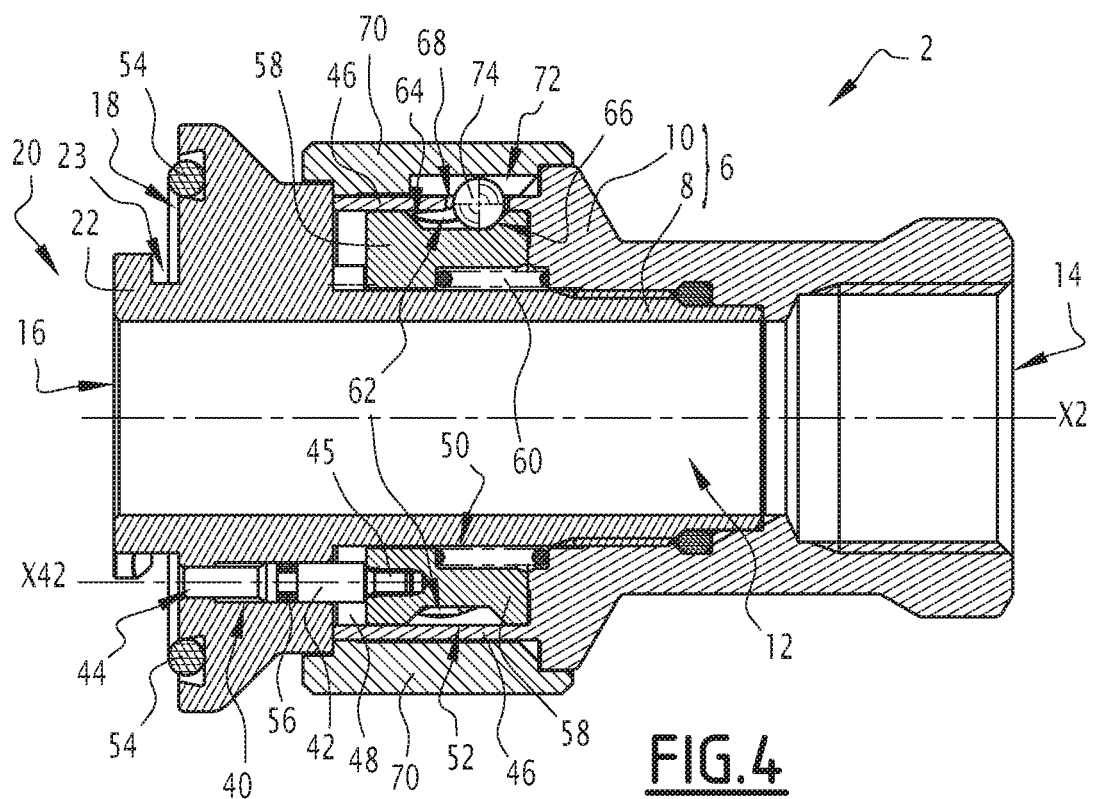
FIG. 4 shows a schematic representation, in a longitudinal sectional view, of the coupling element of FIG. 2, wherein the locking means are illustrated in a second position.
Figure 5:
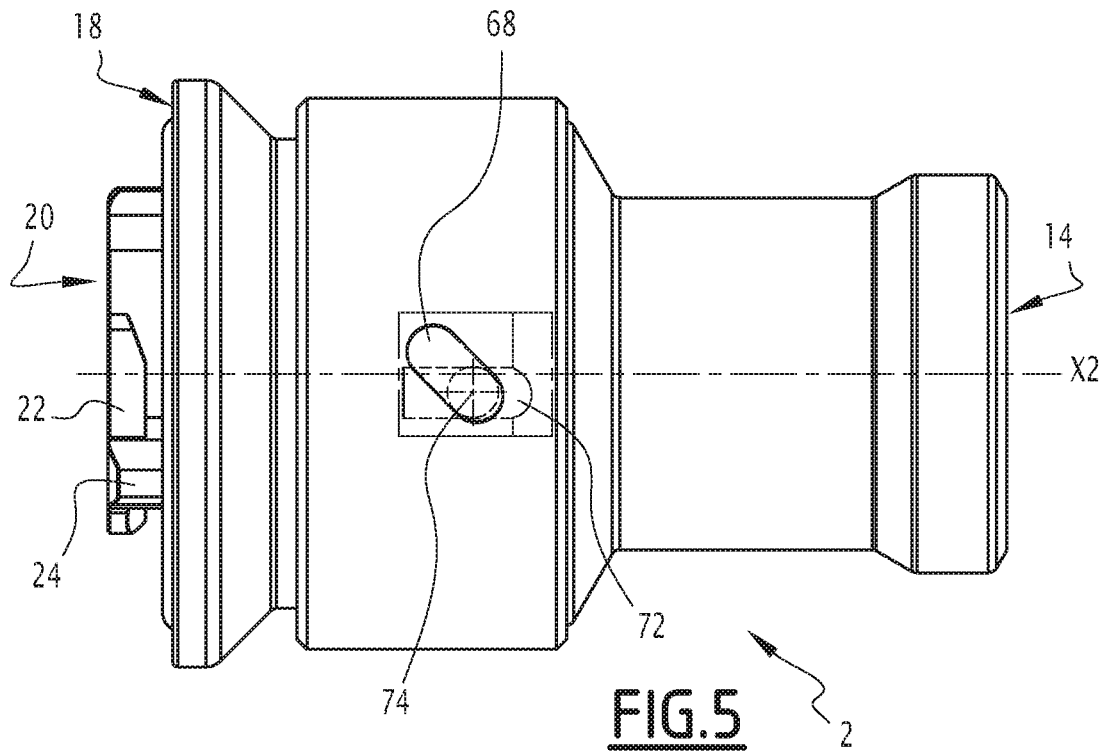
FIG. 5 shows a schematic representation of the coupling element of FIG. 3, in which the locking means are illustrated in the second position.
Figure 6:
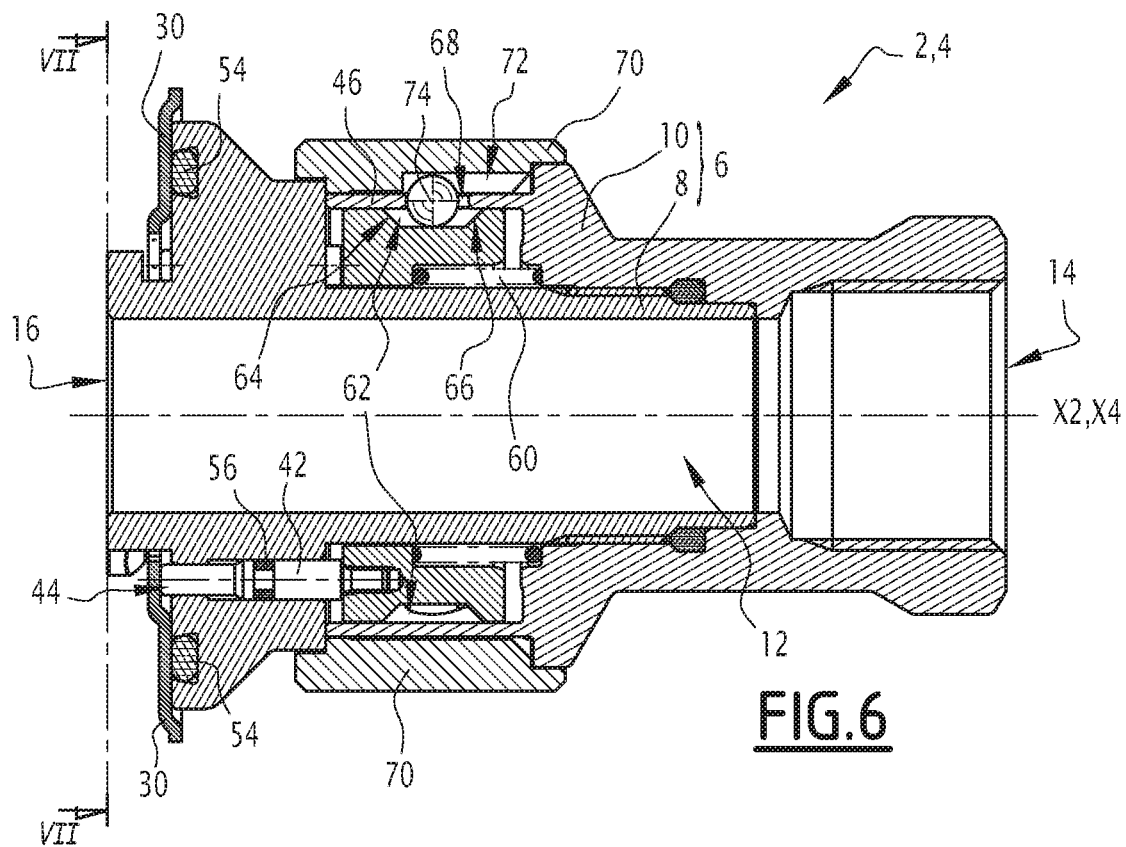
FIG. 6 shows a schematic representation, in longitudinal sectional view, of the coupling element of FIG. 2 and the orifice of the reservoir of FIG. 1 in a disconnected configuration.

As illustrated in FIGS. 2 and 4, the tubular body 6 comprises one or more cylindrical housings 40, parallel to the longitudinal axis X2, here formed in front of the nozzle 8.

These housings 40 are three in number and are regularly distributed around the longitudinal axis X2. Alternatively, their number may be different. These housings 40 are identical to each other and play the same role, so that only one of them is described in more detail in the following. In FIGS. 2 and 4, only one of the housings 40 is visible.

Each housing 40 comprises a locking pin 42 received in this housing and movable in translation along an axis X42 parallel to the longitudinal axis X2. The X42 axis here defines an axis of symmetry of the housing 40. "44" denotes a front end of the locking pin 42, while "45" denotes a rear end of the same locking pin 42.

The housings 40 are arranged so as to open, on the front side of the coupling element 2, at the support surface 18 outside the angular engagement sectors S22. On the rear side, the tubular body 6 comprises a tubular extension 46 at the adapter 10. The housings 40 thus respectively open at the rear in a housing 48 that is generally tubular between a cylindrical outer surface 50 of the nozzle 8 and the cylindrical inner surface 52 of the tubular extension 46.

The cylindrical surfaces 50 and 52 are arranged coaxially around the longitudinal axis X2. Similarly, the tubular extension 46 and the housing 48 are arranged coaxially about the longitudinal axis X2. The housing 48 is delimited on both sides by a lateral front plane and a lateral rear plane, both perpendicular to the longitudinal axis X2.

The coupling element 2 advantageously comprises an O-ring 54 disposed in a circular housing formed on the support surface 18, with a diameter greater than the diameter of the front opening 16.

In this example, the housings 40 open onto the support surface 18 inside the disk delimited by the circular recess of the O-ring 54. In order to ensure good sealing of the coupling element 2, each locking pin 42 comprises an O-ring 56, for example fixed integrally to the body of the locking pin 42 and so dimensioned to allow the displacement of the locking pin 42 in translation while preventing the passage of the fluid into the housing 40.

The O-rings 54 and 56 are made of an elastomeric material.

Each locking pin 42 is reversibly movable between a first position and a second position.

In the first position, also referred to as the advanced position, each locking pin 42 emerges from the support surface 18, wherein the front side of the housing 40 protrudes from the support surface 18, as illustrated in FIGS. 1, 2, 3, 8 and 9. In this advanced position, the locking pin 42 emerges from the support surface 18 with a length sufficient to prevent access to the volume of engagement 23 delimited by the portion of the flange 22.

For example, in this first position, the emerging length of the locking pin 42 is greater than or equal to half the spacing E22 and, preferably, greater than or equal to the spacing E22. This emerging length is defined as being equal to the distance between the support surface 18 and the front face 44 of the locking pin 42, measured parallel to the longitudinal axis X2.

In the second position, also referred to as the retracted position, the front portion of each locking pin 42 is retracted inside the corresponding housing 40 relative to the support surface 18, as illustrated in FIGS. 4, 5, 6 and 7. In this retracted position, the locking pin 42 no longer emerges sufficiently from the support surface 18 to prevent access to the volume of engagement 23 delimited by the portion of the flange 22.

For practical reasons of construction of the coupling element 2, it may happen that, in the retracted position, an end portion of the locking pin 42 may slightly protrude from the support surface 18. However, this protrusion is not sufficient to prevent access to the volume of engagement 23. For example, in the retracted position, the emerging length of the locking pin 42 is less than or equal to one quarter of the spacing E22.

The coupling element 2 further comprises a drive ring 58 which occupies a portion of the housing 48. The drive ring 58 has a cylindrical shape with the longitudinal axis X2 as its axis. The drive ring 58 has a length, measured parallel to the axis X2, which is less than the length of the housing 48, so as to be able to move in translation along the longitudinal axis X2 within the housing 48.

The locking pins 42 remain integral with the drive ring 58 with no degree of freedom at their respective rear ends 45. For example, the locking pins 42 are held by screwing.

Thus, thanks to the drive ring 58, the movement of all the locking pins 42 is simultaneous.

When the drive ring 58 abuts the front of the housing 48, the locking pins 42 are in their advanced position. On the other hand, when the drive ring 58 abuts the housing 48, the locking pins 42 are in their retracted position.

The coupling element 2 also comprises one or more return members 60, designed to return the locking pin 42 to its advanced position. For this purpose, the return members 60 are each designed to exert a resilient restoring force in a direction parallel to the longitudinal axis X2, which returns the locking pins 42 to their advanced position.

In this example, the return member 60 acts, on the one hand, between the tubular body 6 and, on the other hand, the drive ring 58. The restoring force is thus exerted on the locking pins 42 by the intermediary of the drive ring 58.

For example, the return member 60 is a spring, such as a compression metal spring arranged coaxially with the axis X2. Alternatively, the return member 60 may be made differently, for example from a resilient plastic blade. The use of plastic material is advantageous when the tubular body 6 is made of plastic material.

The drive ring 58 further comprises an outer groove 62 having a flat bottom. This groove 62 is formed on the entire outer periphery of the drive ring 58. The groove 62 extends longitudinally along the axis X2 between a distal edge 64 and a proximal edge 66 which are both integral with the ring 58 and which are inclined relative to the flat bottom.

In this example, the groove 62 is indirectly integral with the locking pin 42 via the drive ring 58.

The tubular extension 46 has, in turn, a helical groove 68. This helical groove 68 is formed by an oblong through-opening, which describes a circular helical portion whose axis corresponds to the longitudinal axis X2. The helical groove 68 has two parallel walls which follow a circular helical portion whose tangential angle at each point is at a constant angle $\alpha$ to the longitudinal axis X2. This angle $\alpha$ is here 45° relative to the longitudinal axis X2.

The coupling element 2 further comprises an unlocking ring 70 mounted around the body 6. In this example, the unlocking ring 70 partly surrounds the tubular extension 46 and the nozzle 8. This unlocking ring 70 essentially comprises a ring shape whose axis coincides with the longitudinal axis X2. This unlocking ring 70 is mounted to rotate about the longitudinal axis X2 with respect to the tubular extension 46 and the nozzle 8. On the other hand, the unlocking ring 70 is preferably not movable in translation along the longitudinal axis X2.

The unlocking ring 70 has an outer surface facing outwards from the coupling element 2 and is accessible from outside. On the other hand, it has an inner cylindrical surface which is turned towards the inside of the coupling element 2 and, more precisely, towards the cylindrical passage 12.

The unlocking ring 70 comprises, on its inner cylindrical surface, a longitudinal guide housing 72 extending parallel to the axis X2. This guide housing 72 has the form of an oblong groove delimited by longitudinal walls parallel to the longitudinal axis X2. In other words, this guide housing 72 does not particularly extend entirely around the periphery of the inner cylindrical surface.

The coupling element 2 further comprises a spherical ball 74 which is received in the space defined by the external groove 62 of the drive ring 58, by the helical groove 68 of the tubular extension 46, and by the housing of 72 of the unlocking ring 70. The helical groove 68 and the guide housing 72 have a width that is substantially equal to the diameter of the ball 74 to ensure its guidance.

The ball 74 is preferably made of a rigid material which is not liable to deform when it is mechanically stressed by the components of the coupling element 2. For example, the ball 74 may be made of metallic material, for example steel. Alternatively, the ball 74 may be made of ceramic, or thermoformed plastic material.

In this example, the helical groove 68 forms a means for guiding the ball 74 in order to transform the rotational movement of the unlocking ring 70 about the longitudinal axis X2 to a translation movement of the drive ring 58 with respect to this same longitudinal axis X2.

Thus, in this embodiment, the guide housing 72, the helical groove 68 and the groove 62 associated with the ball 74 provide a mechanical coupling between the unlocking ring 70 and the locking pin 42.

More precisely, in this embodiment, the coupling makes it possible to convert the rotation of the unlocking ring 70 into a translation of the locking pin 42, but not vice versa. In other words, the displacement in translation of the locking pin 42 does not cause a corresponding movement of rotation of the unlocking ring 70.

Such behavior is caused, in particular, by the distance between the distal edge 64 and the proximal edge 66 which is here large enough so that, when the locking pin 42 moves from the advanced position to the retracted position, and the drive ring 58 moves in translation with the locking pin 42, the distal edge 64 does not come into contact with the ball 74 and therefore can not cause it to move. The unlocking ring 70 therefore remains stationary. In one variant, the groove 62 does not have a distal edge 64.

The locking pins 42 thus form locking means for holding the coupling element 2 in a configuration coupled with the circular orifice of the reservoir 4.

The tubular body 6 is preferably made of metallic material. The same applies to the drive 58 and unlocking rings 70.

Alternatively, however, it is possible to use another material, for example a plastic material.

As illustrated with reference to FIGS. 6 to 9, the coupling of the coupling element 2 with the orifice 4 takes place in the following manner.

First, the coupling element 2 is brought in front of the orifice 4, so that their respective longitudinal axes X2 and X4 coincide with each other, and the angular engagement sectors S22 of the front tubular portion 20 lie opposite the inter-tooth spaces 36 of the orifice 4.

Next, the coupling element 2 is brought closer to the orifice 4, while the axes X2 and X4 remain coincident with each other, until the support surface 18 comes into direct contact with the plate 30 of the orifice 4. The locking pins 42 then lie opposite the teeth 34 of the orifice 4.

Figure 7:
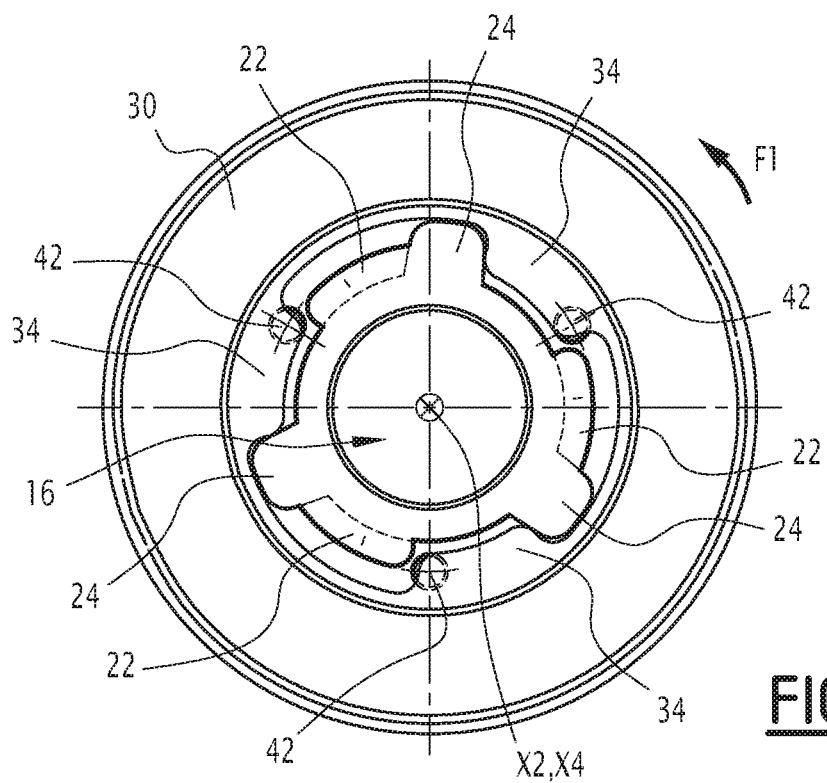
FIG. 7 shows a schematic representation of the coupling element and the orifice of the reservoir of FIG. 6, in a front view in the plane VII-VII of FIG. 6.
Figure 8:
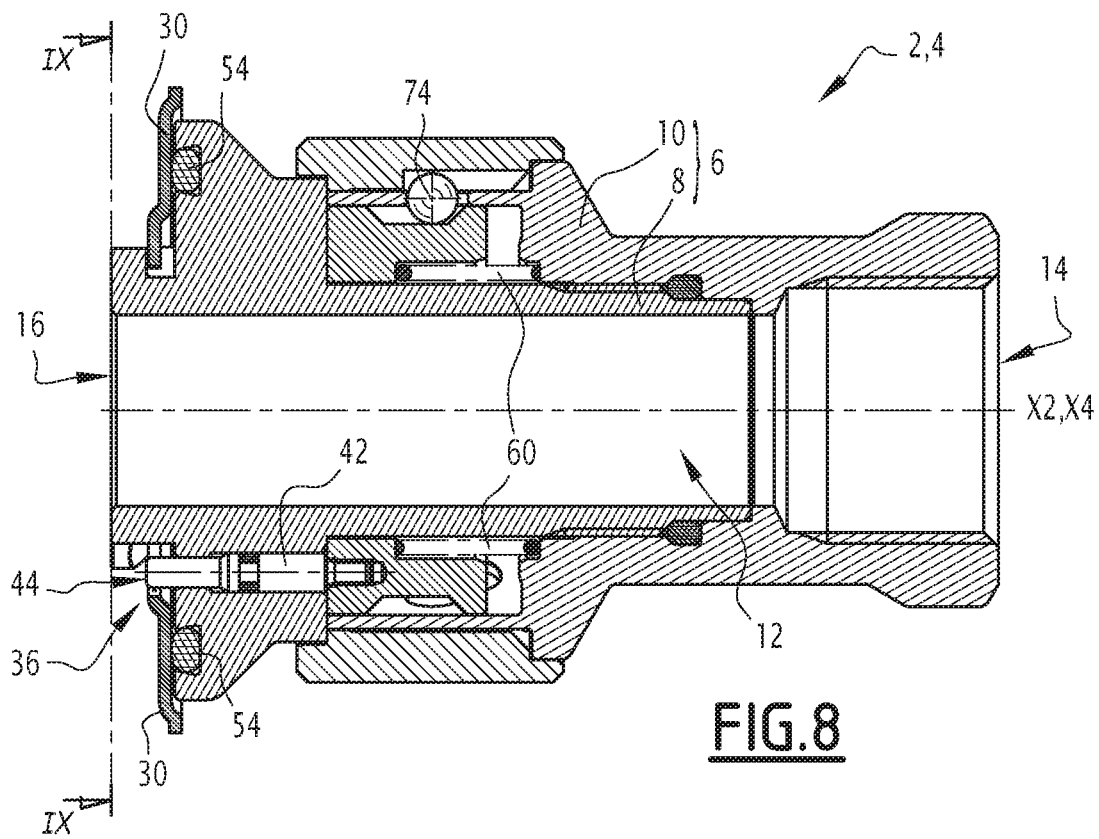
FIG. 8 shows a schematic representation, in longitudinal sectional view, of the coupling element of FIG. 2 and the orifice of the reservoir of FIG. 1 in a coupled configuration.

Under the effect of the force for supporting the coupling element 2 on the orifice 4, which exceeds the restoring force exerted by the return member 60, the locking pins 42 are respectively pushed towards their retracted position inside their housing 40, wherein their front face 44 is in contact with the teeth 34, as illustrated in FIG. 7.

Next, the coupling element 2 and the reservoir orifice 4 are rotated relative to each other about their longitudinal axes X2 and X4 to bring them into their coupled configuration.

For example, the coupling element 2 is rotated with respect to the orifice 4 in the direction illustrated by the arrow F1 in FIG. 7.

As a result of this rotational movement, each tooth 34 enters the volume of engagement 23 between the corresponding portion of the flange 22 and the support surface 18, until the tooth 34 comes into contact with the stop 24 associated with this portion of the flange 22.

Figure 9:
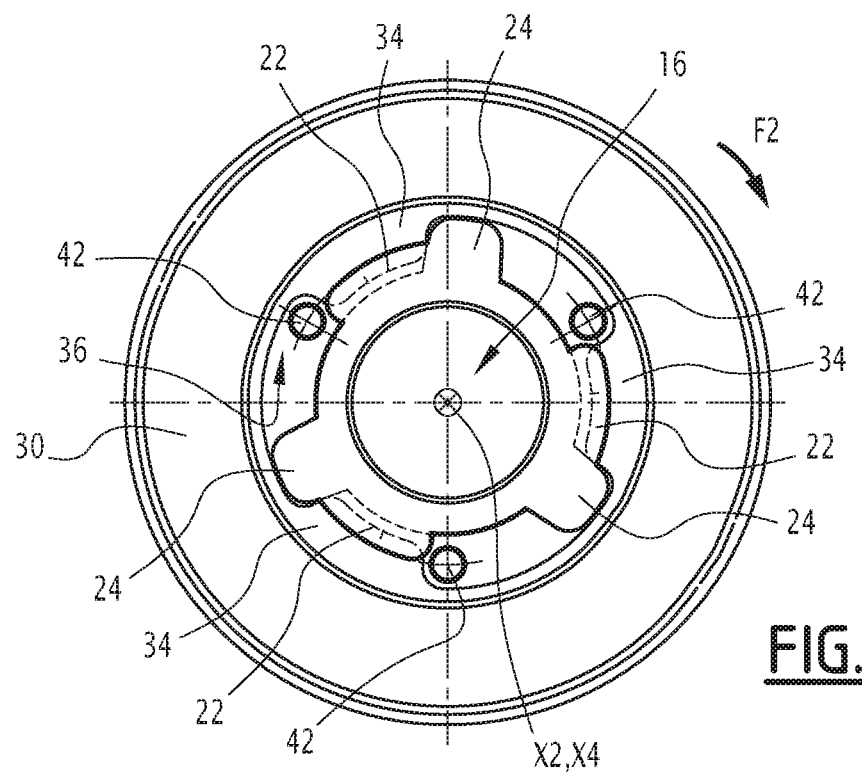
FIG. 9 shows a schematic representation of the coupling element and the orifice of the reservoir of FIG. 8, in a front view in the plane IX-IX of FIG. 8.

When they are in this abutment position, the teeth 34 no longer cover the locking pins 42, which then face the inter-tooth spaces 36, as may be seen in FIG. 9. The locking pins 42 are then returned to their first position by the return member 60, since the teeth 34 no longer oppose this restoring force.

Thus, the locking pins 42, due to their advanced position relative to the support surface 18, prevent the teeth 34 from leaving the volume of engagement 23 by a reverse rotational movement.

The coupling element 2 is then kept locked in the configuration coupled with the orifice 4. The coupling element 2 can not be uncoupled from the orifice 4 by exerting a rotational movement on the fluid line, even if it is involuntary.

To disconnect the coupling element 2 from the orifice 4, the locking pins 42 must first be returned to their retracted position by actuating the unlocking ring 70. For example, the unlocking ring 70 may be moved by a rotational movement about the longitudinal axis X2 in a direction of rotation opposite to that used for the connection.

When the unlocking ring 70 is rotated, the walls of the guide housing 72 push the ball 74 laterally, thereby moving the ball 74 and sliding it along the oblong opening forming the helical groove 68 of the tubular extension 46. As the unlocking ring 70 continues to rotate, the ball 74 travels along the helical portion defined by the helical groove 68, to abut the proximal edge 66 of the groove 62. Once in abutment with the proximal edge 66, it continues to slide along the helical groove 68 and drives the drive ring 58 in translation along the longitudinal axis X2, towards the rear of the tubular body 6. As the locking pins 42 are integral with the drive ring 58, they then move to their retracted position. This movement continues as long as the unlocking ring 70 rotates, and until the drive ring 58 comes into abutment with the rear bottom of the housing 48 against the adapter 10.

At this point, the locking pins 42 have reached their retracted position. In particular, these locking pins 42 no longer emerge sufficiently with respect to the support surface 18 to prevent displacement of the teeth 34. The coupling element 2 and the orifice 4, although still coupled to one another, are no longer locked.

The coupling element 2 and the orifice 4 may then be turned relative to each other in a direction opposite to that previously described during the coupling step, so as to disengage the teeth 34 from the volumes of engagement 23 inside which they are received until the portions of the flange 22 lie opposite the inter-tooth spaces 36 of the orifice 4. The coupling element 2 is then uncoupled from the reservoir 4 and may be removed from it.

For example, this uncoupling movement may be made by continuing to turn the unlocking ring 70 in the same direction, illustrated here by the arrow F2 in FIG. 9, so that it drives in rotation the entire tubular body 6 and causes the teeth 34 to exit the angular engagement sectors S22. Alternatively, the coupling element 2 may be grasped directly to rotate it to the desired direction.

Figure 10:
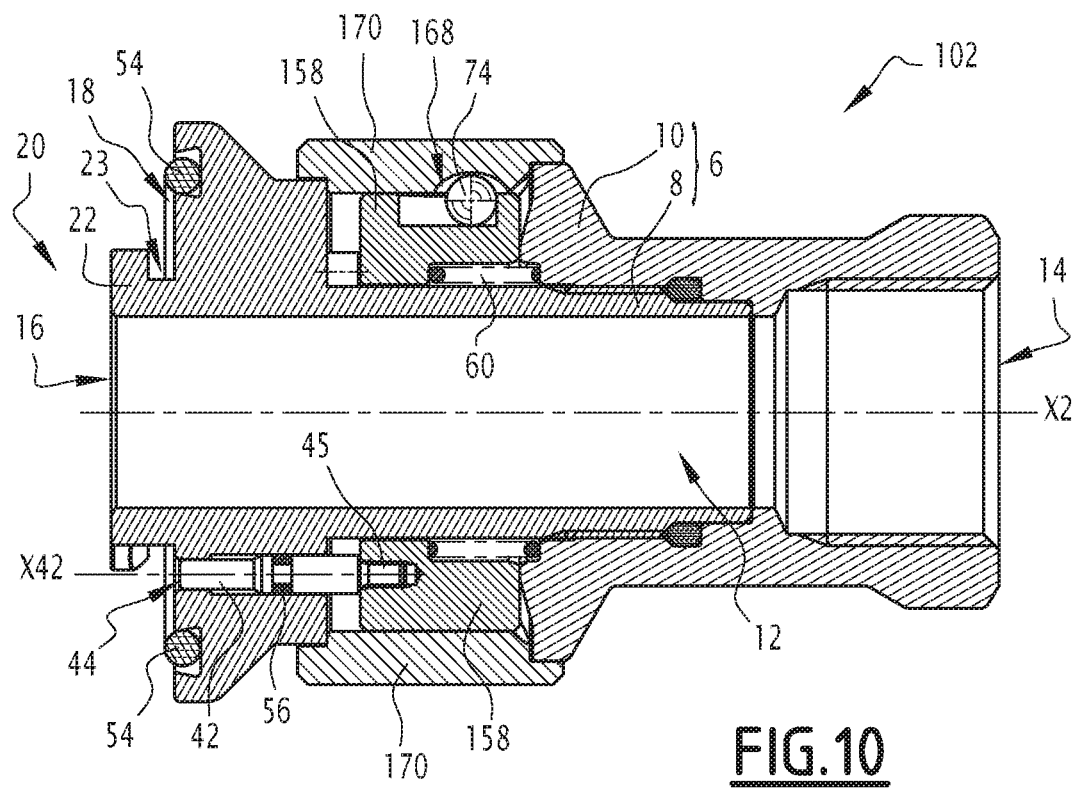
FIGS. 10 and 11 show schematically a coupling element according to a second embodiment of the invention, respectively illustrated in a longitudinal sectional view and in a side view.
Figure 11:
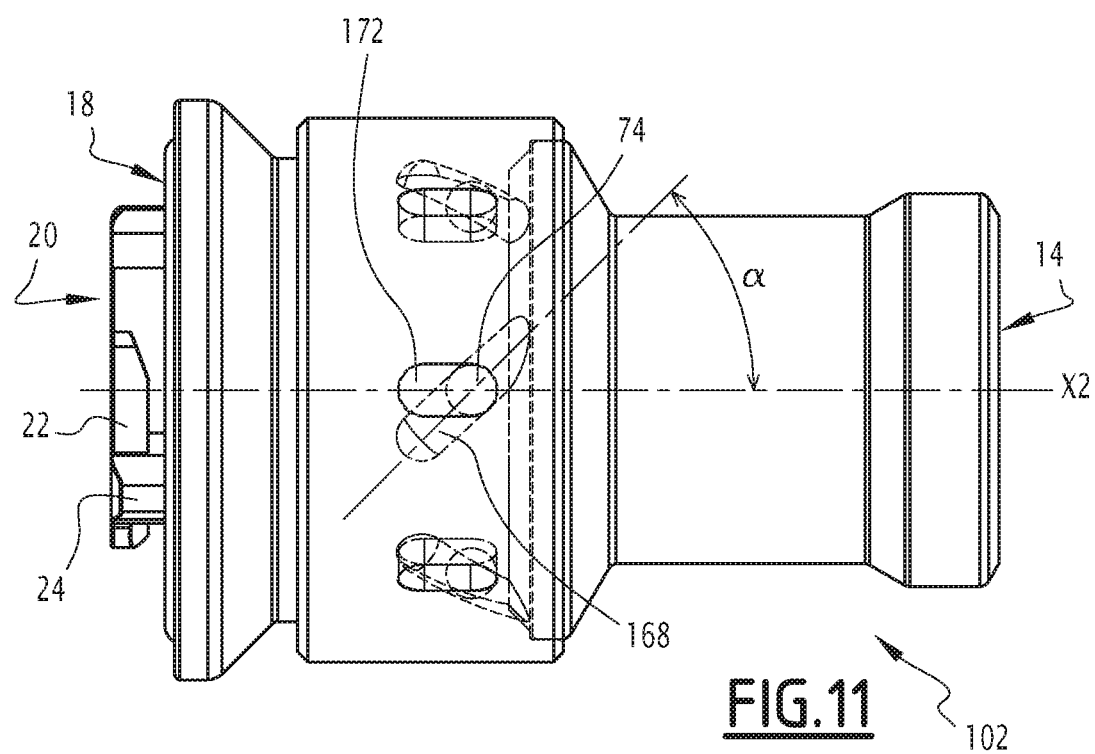

FIGS. 10 and 11 show a coupling element 102 according to a second embodiment of the invention. The components of the coupling element 102 which are analogous to the components of the coupling element 2 of the first embodiment bear the same reference numerals and are not described in detail, since the above description may be transposed to them.

The coupling element 102 differs from the coupling element 2, in particular in that the tubular extension 46 is omitted. The unlocking ring 70 is replaced by an unlocking ring 170 which has, in place of the guide housing 72, a helical groove 168 similar to the helical groove 68. The helical groove 168 forms a groove whose axis follows a helical circular portion. The profile of the groove projected on a plane normal to the tangent of the helix portion is an arc whose radius is slightly greater than the diameter of the ball 74. Apart from these differences, the unlocking ring 170 is similar to the unlocking ring 70 and plays the same role as the unlocking ring 70.

The drive ring 58 is replaced by a drive ring 158 which differs, in particular, in that the groove 62 is replaced by a longitudinal groove 172. This longitudinal groove 172 extends parallel to the longitudinal axis X2.

When the unlocking ring 170 is rotated about the longitudinal axis X2, the ball 74 travels along the helical portion defined by the helical groove 168 to abut against an edge of the longitudinal groove 172. It then drives the unlocking ring 158 in longitudinal displacement parallel to the axis X2, which moves the locking pin 42 to its second position.

Apart from these differences, the coupling and uncoupling of the coupling element 2 with the orifice 4 is carried out in a manner similar to that described with reference to the coupling element 2.

Figure 12:
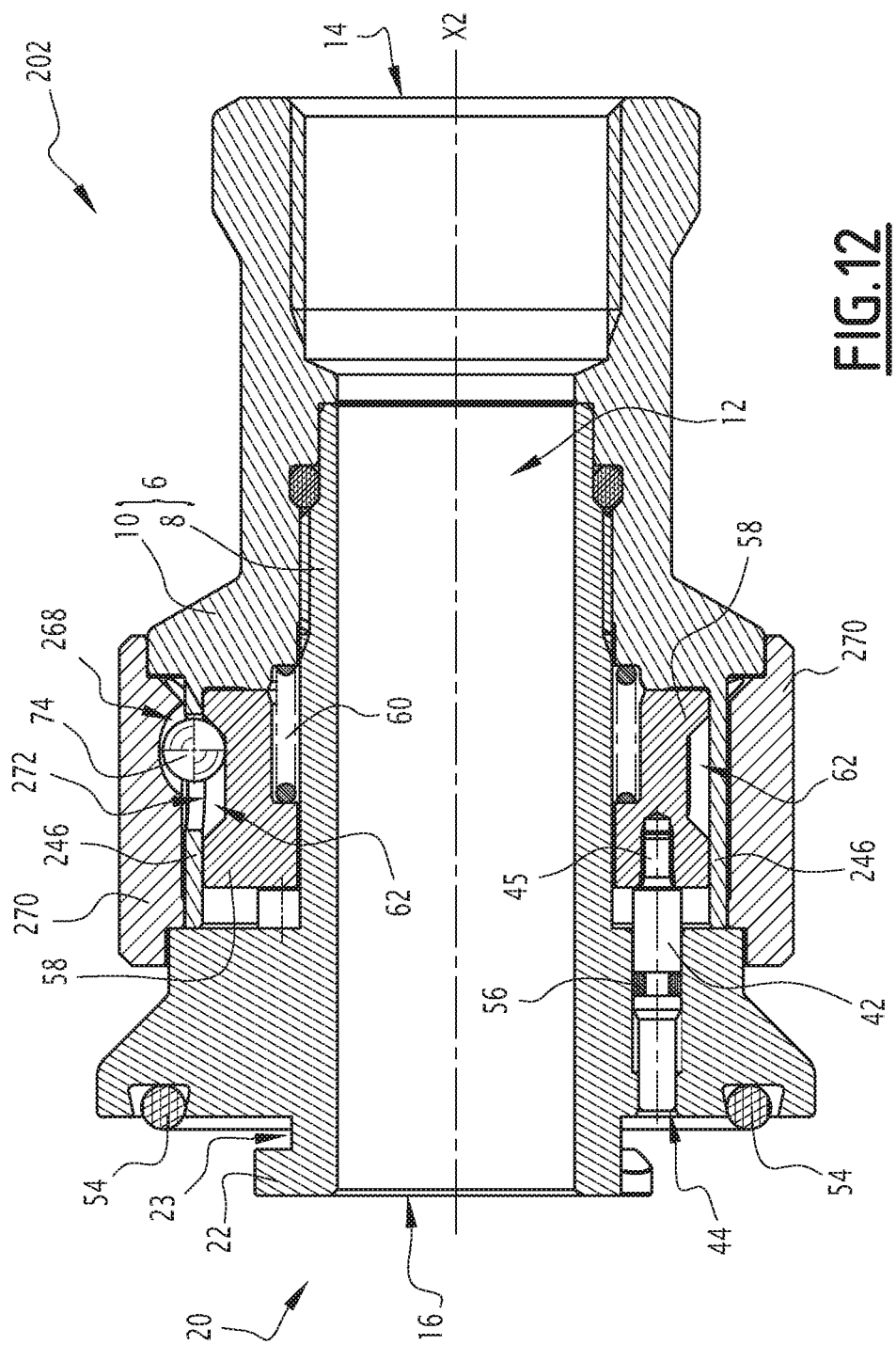
FIG. 12 shows a schematic representation, in a longitudinal sectional view, of a coupling element according to a third embodiment of the invention.

FIG. 12 shows a coupling element 202 according to a third embodiment of the invention. The components of the coupling element 202 which are similar to the coupling element 2 according to the first embodiment bear the same reference numerals and are not described in detail, since the above description may be transposed to them.

The coupling element 202 differs, in particular, from the coupling element 2 in that the unlocking ring 70 is replaced by an unlocking ring 270 in which the longitudinal groove 72 is replaced by a helical groove 268 similar to the groove

68. The tubular extension 46 is replaced by a tubular extension 246 provided with a longitudinal through-groove 272.

The connection and its disconnection of the coupling element 202 with the orifice 4 are effected according to maneuvers identical to those previously described.

Figure 13:
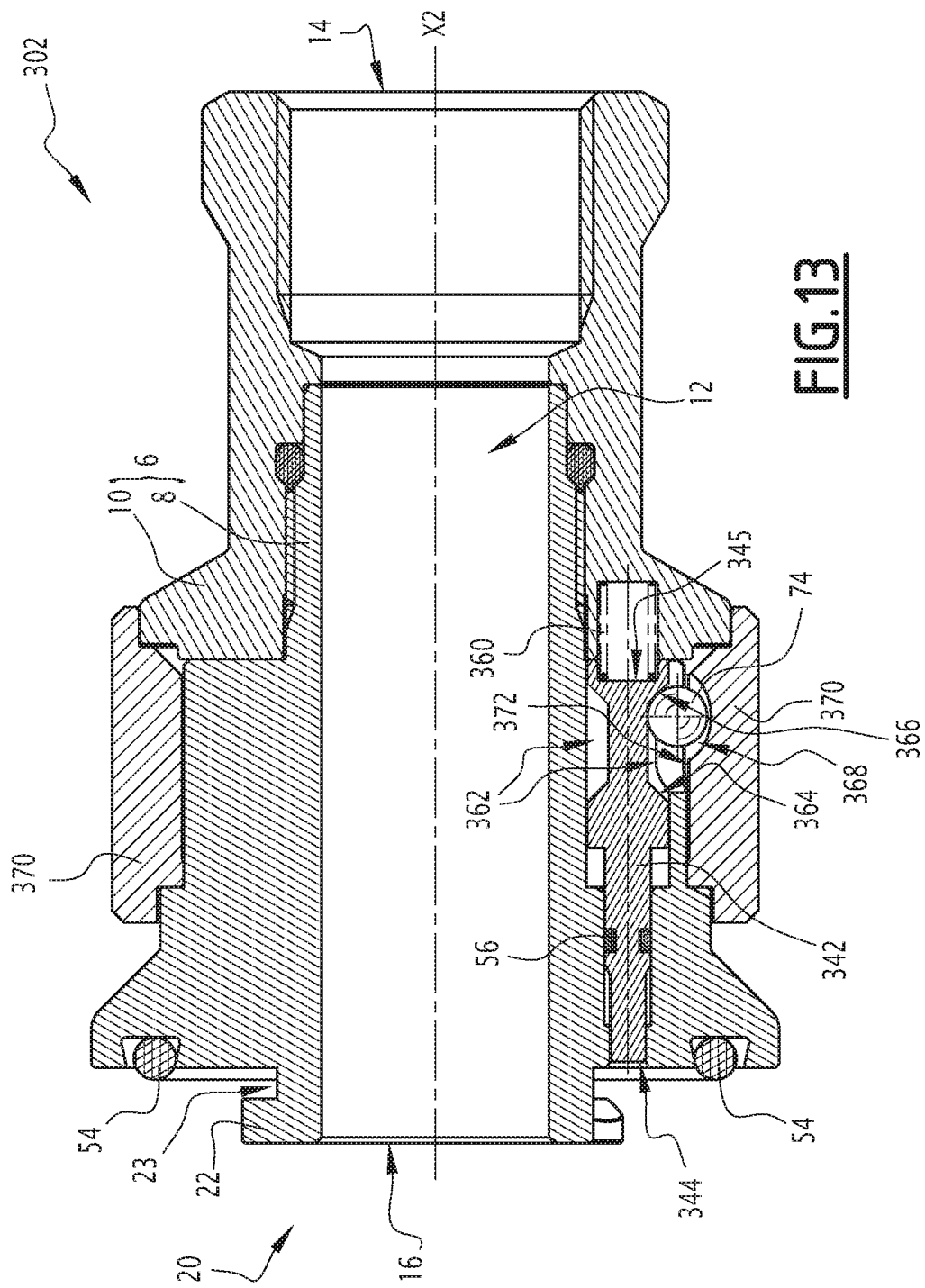
FIG. 13 shows a schematic representation, in a longitudinal sectional view, of a coupling element according to a fourth embodiment of the invention.

FIG. 13 shows a coupling element 302 according to a fourth embodiment of the invention. The components of the coupling element 302 which are analogous to the components of the coupling element 202 according to the third embodiment bear the same reference numerals and are not described in detail, since the above description may be transposed to them.

The coupling element 302 differs, in particular, from the coupling element 202 in that the drive ring 58 is omitted. Each locking pin 342 is then provided with an external groove 362 similar to the groove 62, which is arranged on an outer periphery of each locking pin 342 about the corresponding axis X42 and delimited by a distal edge 364 and a proximal edge 366. The ball 74 is received inside the helical groove 368, the longitudinal groove 372, and the groove 362. The grooves 368 and 372 are of similar form, respectively, to the grooves 268 and 272. The unlocking ring 370 is similar to the unlocking ring 270.

The return member 60 is replaced by a return member 360, which is substantially similar except that the return member 360 acts directly on the locking pin 342. For example, each locking pin 342 is subjected to the action of a return member 360 at its rear face 345. For example, this return member 360 is a spring, such as a metal compression spring, arranged coaxially with the axis X42. The front face of the locking pin 342 is marked "344". The return members 360 thus make it possible to individually return each locking pin 342 towards its first position.

The connection and the disconnection of the coupling element 302 to the reservoir orifice 4 are carried out according to maneuvers identical to those previously described.

Such a construction makes it possible, in particular, to gain radial compactness, which makes it possible to reduce the bulk and to simplify the construction of the coupling element 302.

Figure 14:
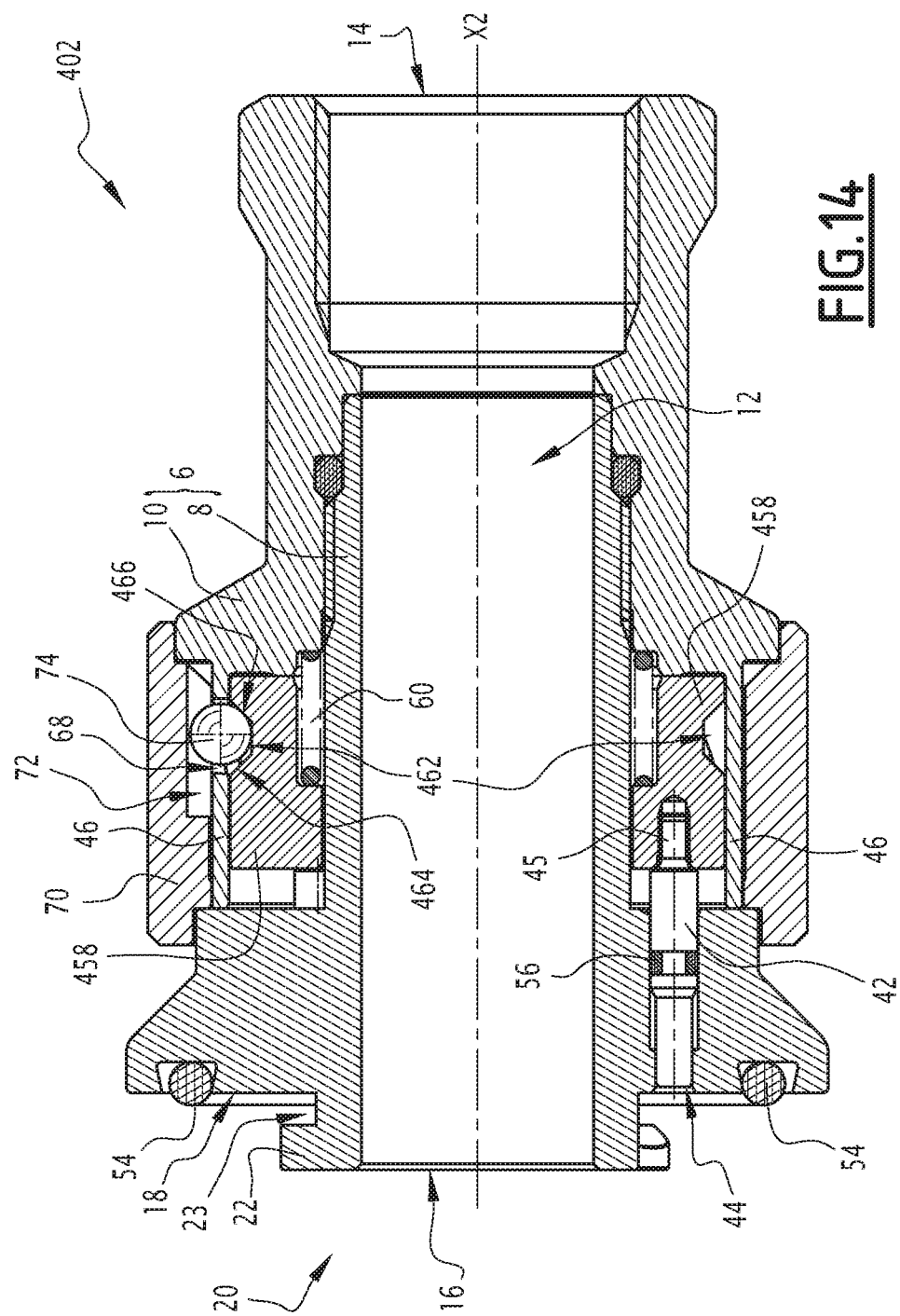
FIG. 14 shows a schematic representation, in a longitudinal sectional view, of a coupling element according to a fifth embodiment of the invention.

FIG. 14 shows a coupling element 402 according to a fifth embodiment of the invention. The components of the coupling element 402 which are similar to those of the coupling element 2 according to the first embodiment have the same reference numerals and are not described in detail, since the above description may be transposed to them.

The coupling element 402 differs, in particular, from the coupling element 2 in that the drive ring 58 is replaced by a drive ring 458 which has a narrow groove 462. The groove 462 is similar to the groove 62, except that it is delimited by a proximal edge 466 and by a distal edge 464 with which the ball 74 is in close interaction. More specifically, the profile of the groove 462 in a plane passing through the longitudinal axis X2 is a portion of a circle whose radius is very slightly greater than that of the ball 74. Apart from these differences, the drive ring 458 plays the same role as the ring 58 and is substantially similar thereto.

Due to this configuration, the movement of the locking pins 42 to their retracted position can not take place without the unlocking ring 70 rotating about the longitudinal axis X2.

Thus, in order to be able to connect the coupling element 402 with the orifice 4, it is essential to leave the unlocking ring 70 free to turn relative to the tubular body 6.

This configuration makes it easy to detect whether the coupling element 402 and the orifice 4 are not held properly locked in their coupled configuration because the locking pins 42 have not been fully moved to their advanced position at the end of the connection phase.

In fact, in this embodiment, the mechanical coupling is such that a displacement of the locking pin 42 between its first position and its second position causes a rotational displacement of the unlocking ring 470 according to a certain predefined angular value. This is due, in particular, to the structure of the narrow groove 462, whose distal edge 464 is in contact with the ball 74 and presses the ball 74 to push it back as soon as the locking pin 42 moves towards its retracted position, under the effect of a force external to the coupling element 402.

Thus, when the locking pin reaches its first position, the unlocking ring 470 must be in a predefined angular position. If, at the end of the coupling phase, the locking pin 42 has not correctly reached its first position, then the unlocking ring 470 is not in its predefined angular position. It is thus possible to visually detect such a situation, for example by comparing the position of the unlocking ring 470 with its expected predefined position, which may be evident on the outer surface of the coupling element 402 by means of one or more visual indicators.

As a result, it is easier to detect a connection fault that may inadvertently disconnect the coupling element 402 and thus cause undesired fluid leakage. The fluid connection made by means of the coupling element 402 is thus more reliable and safer. Such a use is particularly advantageous when the coupling element 402 is used for the transport of liquids with dangerous properties.

According to another embodiment of the coupling element 2, not illustrated in the figures, the helical groove receiving the ball 74 is formed on the drive ring 58. The unlocking ring 70 is then provided with a groove in the form of a longitudinal groove, similar to that previously described, and interacting with the ball 74.

FIGS. 15 to 18 show a coupling element 502 according to a sixth embodiment of the invention. The components of the coupling element 502 which are similar to those of the coupling element 2 according to the first embodiment, are given the same reference numerals and are not described in detail, insofar as the description above may be transposed to them.

The coupling element 502 differs, in particular, from the coupling element 2 in that it further comprises a movable valve 580 arranged inside the tubular body 6. More specifically, the valve 580 is movable between a closed position, illustrated in FIG. 15 and preventing the flow of liquid in the tubular passage 12 between the openings 14 and 16, and an open position, illustrated in FIG. 16, wherein it allows the passage of liquid inside the tubular passage 12 between the openings 14 and 16.

The valve 580 comprises, in particular, a body formed by a rod 582, extending longitudinally along the longitudinal axis X2, and a head 584, integral with the rod 582. In this example, the rod 582 and the head 584 are formed in one piece and are integral with each other.

For example, the valve 580 is made of metal or plastic.

The coupling element 502 also comprises an inner body 586 which is arranged inside the tubular passage 12, for example at the junction between the nozzle 8 and the adapter 10. This inner body 586 is intended to interact with the head 584 of the valve 580 forming a narrowing of the tubular passage 12, with a passage diameter corresponding to the dimensions of the head 584.

Figure 15:
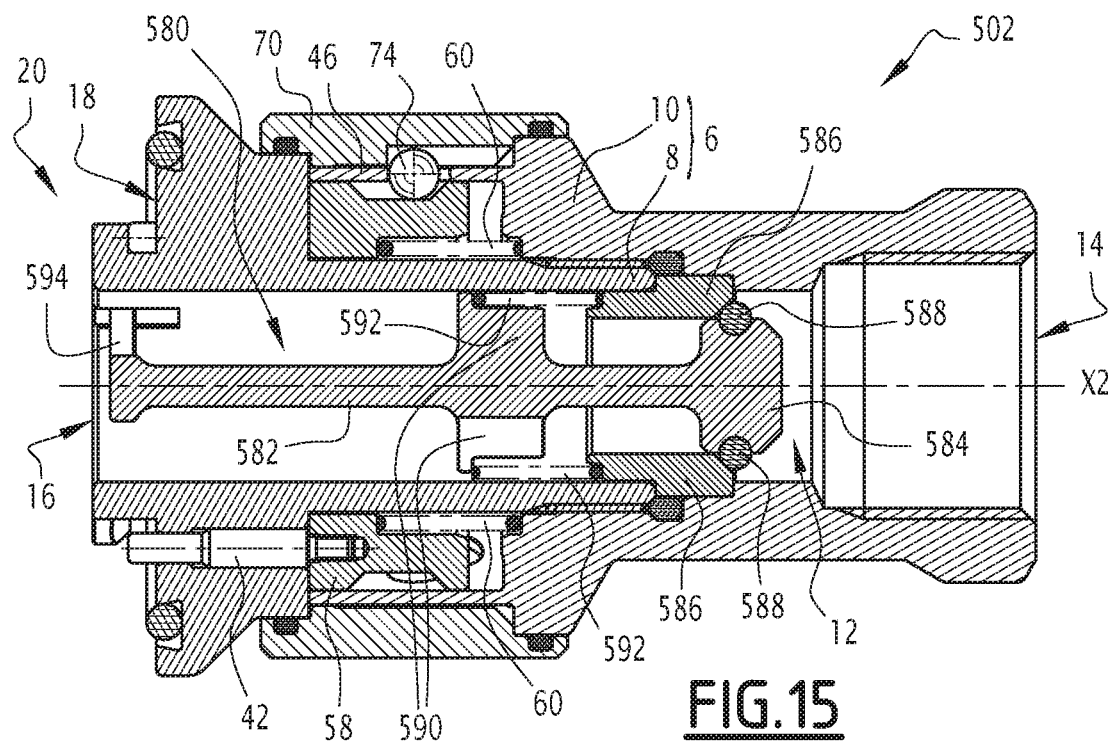
FIGS. 15 to 18 show schematically a coupling element according to a sixth embodiment of the invention.
Figure 16:
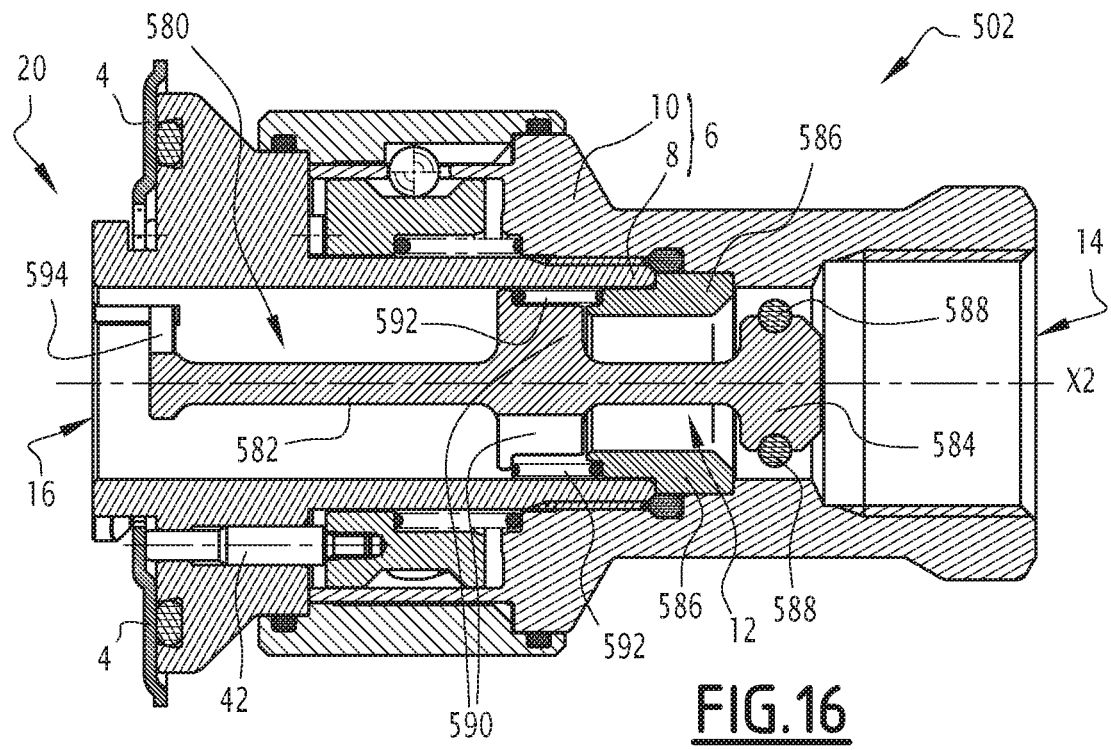
Figure 17:
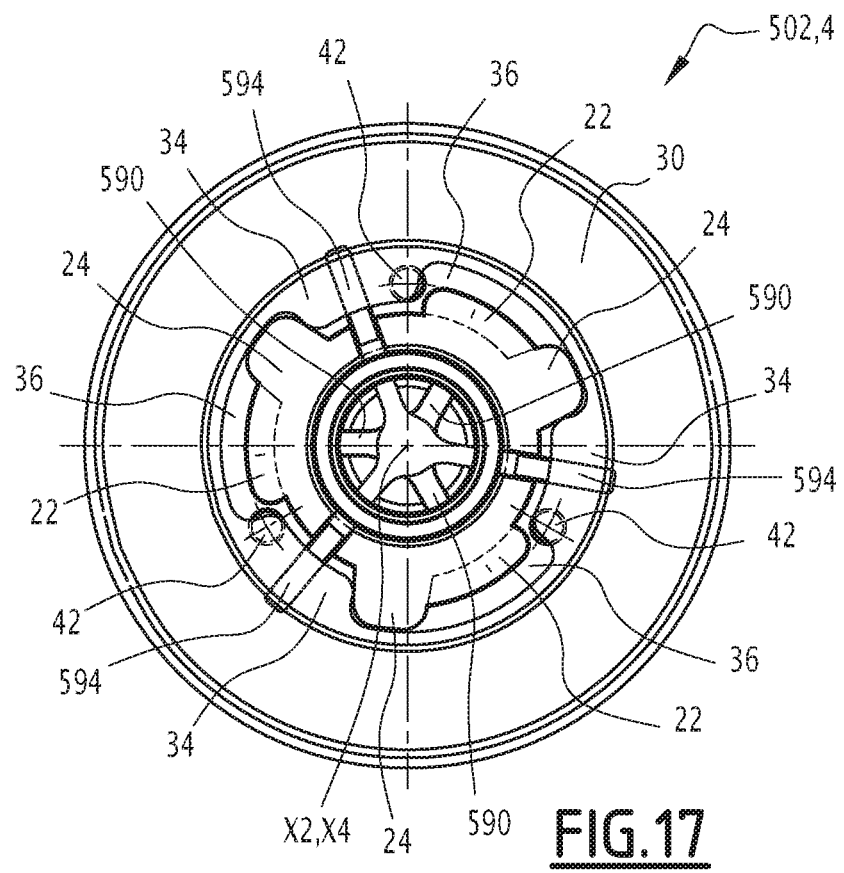
Figure 18:
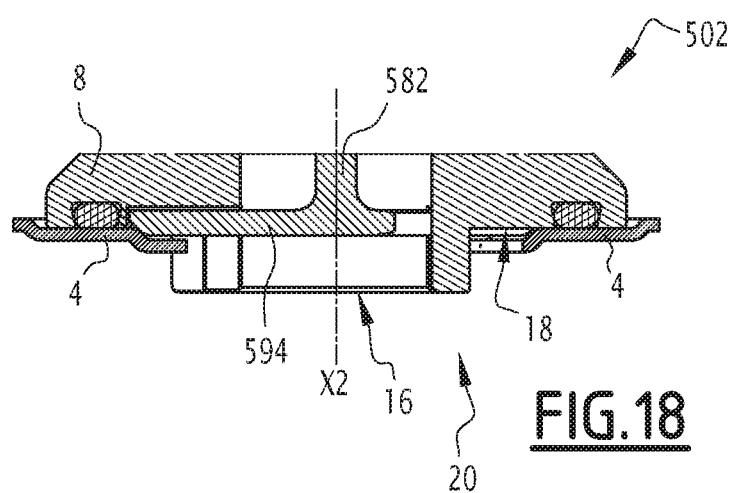

As may be seen in FIGS. 15 and 16, when the valve 580 is in the closed position, the head 584 is in contact with the inner body 586 to prevent passage of a liquid. When the valve 580 is in the open position, the head 584 is spaced apart from the inner body 586, thereby allowing a passage of liquid between the edges of the head 584 and the inner body 586.

Advantageously, the head 584 is provided with an O-ring 588 which makes it possible to ensure good sealing when the valve 580 is in the closed position, wherein this O-ring 588 then comes into direct contact with the inner body 586.

The O-ring 588 is, for example, made of an elastomeric material, such as silicone.

The valve 580 further comprises anchor arms 590 which extend radially with respect to the rod 582. These radial arms 590 are three in number and are arranged equidistantly around the rod 582, for example in a star arrangement at an angle of 120° relative to each other in a plane perpendicular to the longitudinal axis X2.

The radial arms 590 extend to the bore of the nozzle 8 and allow the translational guidance of the valve 582 in the tubular passage 12. An elastic return member 592 is mounted between the inner body 586 and the radial arms 590. The return member 592 is arranged to exert an elastic restoring force which tends to bring the valve 580 back to its closed position. For example, the return member 592 may be a helical compression spring.

The valve 580 further comprises rigid probes 594 which extend radially from a front portion of the rod 582. For example, the probes 594 extend from the front end of the rod 582. The probes 594 are three in number and are identical to each other. For example, these probes 594 may be arranged in a star at an angle of 120° relative to each other, wherein this angle is measured in a geometric plane perpendicular to the longitudinal axis X2.

Preferably, the probes 594 emerge from the support surface 18 outwards from the coupling element 502 when the valve 580 is in the closed position. These probes 594 have a length greater than half the diameter D1, wherein this length is measured in a geometric plane perpendicular to the longitudinal axis X2 from the center of the rod 582.

The probes 594 are thus intended to come into contact with the plate 30 of the reservoir orifice 4 during the phase of connecting the coupling element 502 with the orifice 4. In other words, the valve 580 is configured to be moved to its open position by the pressing force exerted by the nozzle 4 on the probes 594 when the coupling element 502 is brought into contact with the reservoir orifice 4. This pressing force exceeds the restoring force exerted by the return member 592, thus allowing a movement of the valve 580 to its open position.

In fact, the passage of the liquid inside the tubular passage 12 is only allowed once the coupling element 502 is coupled with the orifice 4, which reduces the risk of fluid leakage.

When the coupling element 502 is uncoupled from the reservoir orifice 4, the valve 580 is returned to its closed position by the return member 592. The liquid coming from the pipe coupled to the opening 14 is then prevented from circulating inside the tubular passage 12.

This embodiment may advantageously be implemented independently of the nature of the mechanical coupling between the unlocking ring 70 and the locking pins 42. Thus, the valve 580 and the inner body 586 may be integrated within any coupling elements previously described.

Figure 19:
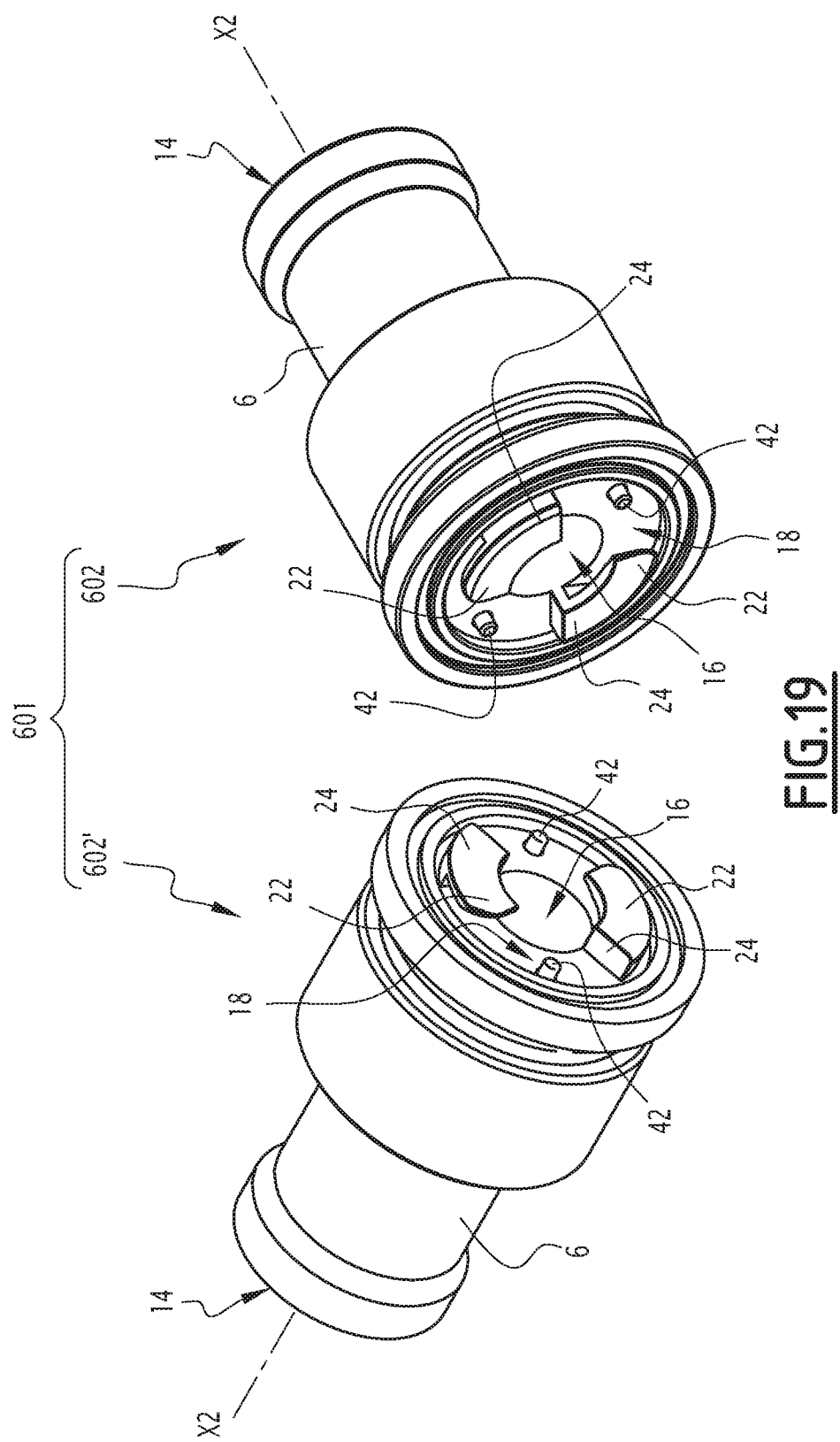
FIG. 19 shows schematically two coupling elements that are intended to be connected together to form a coupling and at least one of which is in accordance with one of the embodiments of the invention.

Finally, FIG. 19 shows a seventh embodiment of the invention. The elements of this seventh embodiment, which are analogous to those of the first embodiment, bear the same numerical reference numerals and are not described in more detail, since the above description may be transposed to them.

In particular, FIG. 19 represents an assembly 601 comprising a first coupling element 602 and a second coupling element 602'.

The coupling elements 602 and 602' are here identical to each other. They are similar to the coupling element 2 according to the first embodiment and differ only in the number of engagement sections S22 and therefore by the number of portions of the flange 22, which are two in number. The number of stops 24 and locking pins 42 is designed accordingly and is here likewise equal to two. Alternatively, this number may be different.

The coupling elements 602 and 602' are able to be coupled with each other to form the connector 601, so as to allow the transfer of a liquid. For this purpose, each coupling element 602, 602' is connected to a fluid line at its opening 14. The connection 601 thus makes it possible to circulate a fluid between two pipes.

The coupling element 602' here forms a complementary element to the coupling element 602, and vice versa. In particular, the portions of the flange 22 of the coupling element 602 form teeth capable of interacting with the portions of the flange 22 of the coupling element 602' in a manner analogous to that described with reference to the teeth 34. The elements 602 and 602' are said to be "hermaphrodite", as opposed to the "male" or "female" coupling elements that are otherwise known.

However, as a variant, one or the other of the coupling elements 602 and 602', or even both, may be according to any one of the previously described embodiments.

In particular, at least one or other of the coupling elements 602 and 602' may optionally include a valve similar to the valve 580 previously described. However, in such a case, the number and the spatial arrangement of the probes 594 are modified, so as to prevent them from interfering with the displacement of the locking pins 42 or the path of the teeth 34 during the coupling and uncoupling operations. For example, such a valve comprises a single probe 594.

In the embodiments described, the helical grooves follow a circular helical portion whose tangential angle α at each point with respect to the longitudinal axis X2 is constant and equal to 45°. The invention also functions for an angle α chosen between 30 and 60°. Similarly, it may be envisaged to vary the angle α along the helical groove in the range of 30 to 60°. It is then possible to give some progressivity to the movement of the locking pins 42.

In the embodiments described, the helical grooves are associated with longitudinal grooves which are strictly parallel to the longitudinal axis X2. They could also follow a portion of a helix whose tangential angle is slightly inclined, for example by 5° with respect to the longitudinal axis X2.

The embodiments and alternatives contemplated above may be combined with one another to generate new embodiments.

The invention claimed is:

1. A coupling element for connecting a fluid line to a complementary element, wherein this coupling element comprises a tubular body extending along a longitudinal axis, wherein the tubular body is provided at one end with a connection interface to a fluid line and is also provided at an opposite end with an engagement element, wherein the engagement element extends longitudinally with respect to a support surface that is perpendicular to the longitudinal axis and comprises a radial portion of a flange facing outwards from the longitudinal axis and extending over an angular engagement sector, wherein the coupling element further comprises:

at least one locking pin movable in translation inside the tubular body, parallel to the longitudinal axis, between a first position in which it emerges from the support surface and a second position in which it is retracted from the support surface inside the tubular body, a return member for returning the locking pin to its first position;

an unlocking ring surrounding the tubular body, wherein the unlocking ring is rotatable about the longitudinal axis wherein the unlocking ring is mechanically coupled to the locking pin by means of a ball and a helical groove to guide the ball so as to transform the rotational movement of the unlocking ring about the longitudinal axis into a translation movement of the locking pin from its first position to its second position.

2. The coupling element of claim 1, wherein the helical groove passes through a portion of the tubular body, and wherein the unlocking ring comprises a longitudinal guide housing, wherein the ball is received within the helical groove and the guide housing to be guided.

3. The coupling element of claim 1, wherein the helical groove is formed on an inner surface of the unlocking ring, and wherein a longitudinal groove passes through a portion of the longitudinal body, wherein the ball is received within the helical groove and the guide housing to be guided.

4. The coupling element of claim 1, wherein the helical groove is provided on an inner surface of the unlocking ring, and that a longitudinal groove is integral with the locking pin, wherein the ball is received within the helical groove and the longitudinal groove to be guided.

5. The coupling element according to claim 1, wherein the ball interacts with a groove that is integral with the locking pin, wherein this groove is delimited along the longitudinal axis by a proximal edge, wherein the ball is further received within this groove and presses on this proximal edge to drive the locking pin to its second position.

6. The coupling element according to claim 5, wherein the locking pin is integral with a drive ring movable in translation along the longitudinal axis, and wherein the groove is provided on the drive ring and wherein the return member acts on the drive ring.

7. The coupling element of claim 6, wherein the groove is also delimited by a distal edge, so that the distal edge contacts the ball and presses the ball when the locking pin is moved to its second position under the effect of a force external to the coupling element.

8. The coupling element of claim 5, wherein the groove is formed directly on the locking pin and forms the longitudinal groove that is integral with the locking pin and wherein the return member acts directly on the locking pin.

9. The coupling element of claim 8, wherein the groove is also delimited by a distal edge, so that the distal edge contacts the ball and presses the ball when the locking pin is moved to its second position under the effect of a force external to the coupling element.

10. The coupling element according to claim 1, wherein it comprises a valve movable in translation inside the tubular body, between a closed fluid passage position and an open fluid passage position, wherein the valve comprises a rigid probe which emerges from the support surface when the valve is in the closed position.

11. The coupling element according to claim 1, wherein the helical groove for guiding the ball follows a circular helix portion whose tangential angle at each point with respect to the longitudinal axis is between 30 and 60°.

12. The coupling element according to claim 11, wherein the tangential angle at each point relative to the longitudinal axis, is constant.

13. A connector comprising a first coupling element and a second coupling element, wherein at least one of the first and second coupling elements is as claimed in claim 1.

* * * * *